United States Patent
Greeff et al.

(10) Patent No.: US 10,339,075 B2
(45) Date of Patent: Jul. 2, 2019

(54) CLOCK TREE STRUCTURE IN A MEMORY SYSTEM

(71) Applicant: Micron Technology, Inc., Boise, ID (US)

(72) Inventors: Roy E. Greeff, Boise, ID (US); George Pax, Boise, ID (US); Timothy Mowry Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/693,027

(22) Filed: Aug. 31, 2017

(65) Prior Publication Data

US 2019/0064871 A1    Feb. 28, 2019

(51) Int. Cl.
| | |
|---|---|
| *G06F 12/00* | (2006.01) |
| *G06F 13/16* | (2006.01) |
| *G06F 1/10* | (2006.01) |
| *G06F 13/40* | (2006.01) |
| *G06F 13/42* | (2006.01) |

(52) U.S. Cl.
CPC .......... *G06F 13/1689* (2013.01); *G06F 1/10* (2013.01); *G06F 13/1673* (2013.01); *G06F 13/4086* (2013.01); *G06F 13/4256* (2013.01); *G06F 13/404* (2013.01); *G06F 13/4234* (2013.01)

(58) Field of Classification Search
None
See application file for complete search history.

(56) References Cited

U.S. PATENT DOCUMENTS

| | | | |
|---|---|---|---|
| 2005/0174878 A1* | 8/2005 | Osaka ................. | G11C 7/1051 365/233.1 |
| 2014/0181452 A1* | 6/2014 | Malladi ............... | G11C 29/023 711/166 |

\* cited by examiner

*Primary Examiner* — Daniel D Tsui
(74) *Attorney, Agent, or Firm* — Schwegman Lundberg & Woessner, P.A.

(57) ABSTRACT

A computing system including multiple integrated circuit memory devices is described. One or more command and address buses are connected to the memory devices to transmit command and address signals to each memory device. Multiple clock lines are connected to the multiple memory devices in a tree structure to transmit multiple clock signals to these memory devices. The tree structure allows each distributed clock signal to be individually trained such that the multiple clock signals provide each memory device with a clock signal that is temporally aligned with the command and address signals as received by that memory device.

20 Claims, 4 Drawing Sheets

CLOCK TREE STRUCTURE IN A MEMORY SYSTEM

BACKGROUND

Memory modules includes integrated circuit memory devices mounted on printed circuit boards that can be used in computing devices. One example is dual in-line memory module (DIMM), which can include dynamic random access memory (DRAM device) devices mounted on a circuit board to be connected to, for example, a motherboard in a personal computer. Increased speed of operation of the computing device requires high rates at which data are read from and written into memory modules. One technique to accommodate high data rate is daisy chaining, such as the daisy chaining of the DRAM devices in a DIMM. Such a daisy chaining method allows signaling at higher speeds by distributing the load impedance seen at the command and address lines connected to the DRAM devices.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. References to "an", "one", or "various" embodiments in this disclosure are not necessarily to the same embodiment, and such references contemplate more than one embodiment. The following detailed description provides examples, and the scope of the present invention is defined by the appended claims and their legal equivalents.

This document discusses, among other things, a system and method for routing clock signals to memory devices connected with command and addresses lines, in a manner allowing for alignment of each clock signal with command and address signals for each of the memory devices. An example of the memory module includes a dual in-line memory module (DIMM) that can include multiple dynamic random access memory (DRAM) devices. The DIMM structure allows for higher data rates by distributing the load capacitance. However, timing for the command and address signals to arrive at different DRAM devices may be significantly different when the distances of the command and address lines and load capacitances are significantly different for different DRAM devices. When the clock is also routed similarly to the command and address signals, significantly different delays of the clock signals may be seen at different DRAM devices due to different distances and load capacitances of the clock lines. Thus, there is a need for alignment of clock signals with the command and address signals for each DRAM device in a DIMM for accurate clocking of the command and address signals into that DRAM device.

Figure 1:
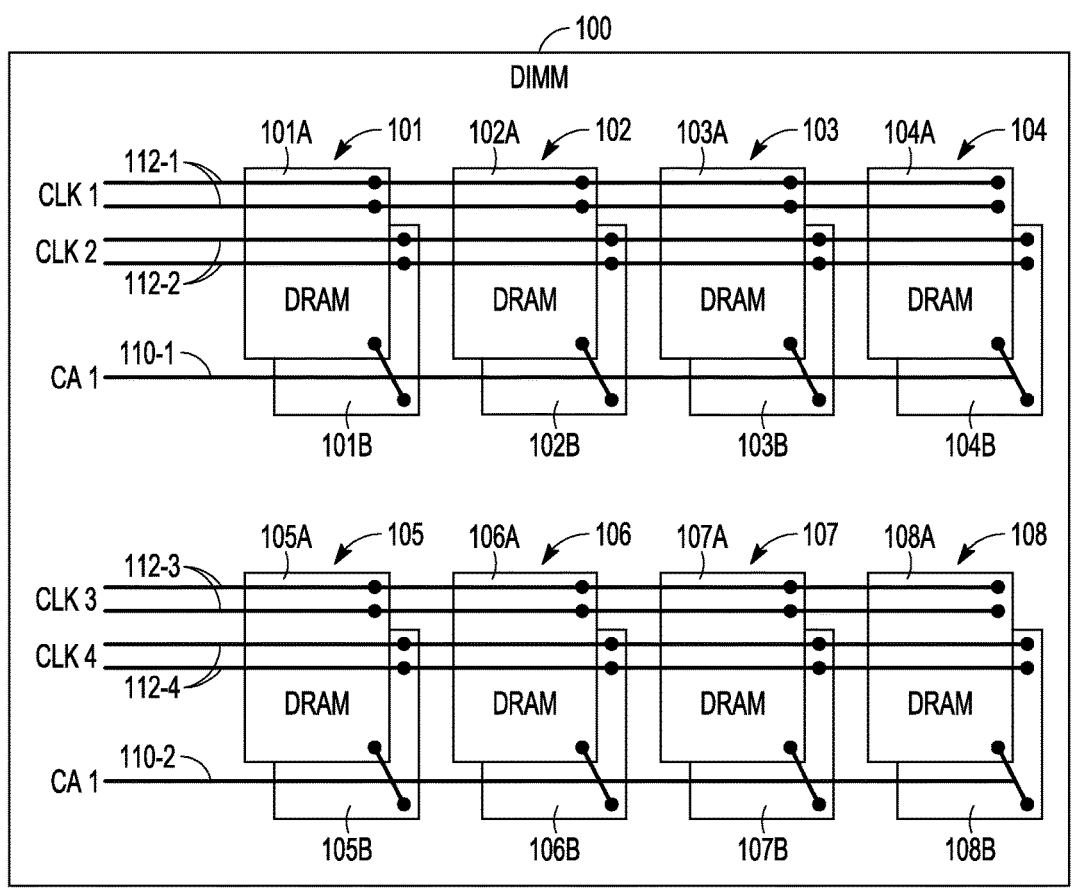
FIG. 1 illustrates an example of portions of a circuit of a dual in-line memory module (DIMM) with command and address lines and clock lines.

FIG. 1 illustrates an example of portions of a circuit of a DIMM 100 with command and address buses 110-1 and 110-2 and differential clock lines 112-1, 112-2, 112-3, and 112-4. DIMM 100 can include any number of DRAMs, with DRAM devices 101, 102, 103, 104, 105, 106, 107, and 108 shown in FIG. 1 as an example for the purpose of illustration. In the illustrated example, the DRAMs are arranged in two rows with a first row including DRAM devices 101, 102, 103, and 104, and a second row including DRAM devices 105, 106, 107, and 108. DIMM 100 may be implemented with the first row mounted on a main surface of the DIMM circuit board and the second row mounted on a back surface of the DIMM circuit board. DRAM devices 101, 102, 103, and 104 are connected to command and address bus 110-1 to receive command and address signals CA1. DRAM devices 105, 106, 107, and 108 are connected to command and address bus 110-2 to receive command and address signals CA2. Due to large load capacitances, each of the DRAM devices is divided into portions A and B each to be connected to one of the clock lines. Thus, as shown in FIG. 1, DRAM devices 101, 102, 103, 104, 105, 106, 107, and 108 are divided into DRAM device portions 101A and 101B, 102A and 102B, 103A and 103B, 104A and 104B, 105A and 105B, 106A and 106B, 107A and 107B, and 108A and 108B, respectively. DRAM device portions 101A, 102A, 103A, and 104A are connected to differential clock line 112-1 to receive differential clock signal CLK 1. DRAM device portions 101B, 102B, 103B, and 104B are connected to differential clock line 112-2 to receive differential clock signal CLK 2. DRAM device portions 105A, 106A, 107A, and 108A are connected to differential clock line 112-3 to receive differential clock signal CLK 3. DRAM device portions 105B, 106B, 107B, and 108B are connected to differential clock line 112-4 to receive differential clock signal CLK 4. The above example is illustrative only, and each DRAM device may include more than two portions, with each portion coupled to a respective differential clock signal.

Clock lines have characteristics different from those of command and address buses. For example, as shown in FIG. 1, the clock signals CLK 1-4 are differential signals while the command and address signals CA 1-2 are each single ended signals. The clocks are running at twice the speed of the command and address buses. At higher speeds, the clock lines have less capacitive load. For ensuring alignment of clock signals at the presence of large load capacitance within a DRAM device, DIMM 100 includes use two clocks for each command and address bus. Existing DIMM design seeks proper clock alignment by considering relevant factors such as board routing, package parasitic, and DRAM device capacitance. The clock signals can be adjusted for alignment with the command and address signals. However, when the DRAM devices are distributed, some clock skewing may remain to cause memory reading and/or writing inaccuracies. When the clock signals are transmitted, complete clock training cannot be achieved because if a clock signal is aligned with one or one set of the DRAM devices in a DIMM, there is no guarantee that the clock are also aligned with the other DRAM devices along different locations. For example, in DIMM 100, clock signal CLK 1 cannot be completely trained for alignment with the command and address signal CA1 for each of DRAM devices 101, 102, 103, and 104.

The present system includes a tree structure for clock lines in a memory system with command and address buses. While the topology is used to distribute the capacitance to accommodate high-speed command and address signals, this is not as critical a factor for clock signals because clocks inherently have no inter-symbol interference (ISI) and are signaled differentially. The "tree structure" of the present system is a clock structure in one or more origin clock signals are distributed to multiple "branches" in which separate clock signals are routed for each of the locations of the command and address bus where the command and address signals are clocked. This tree structure allows for full clock training for each of these locations by using a controller of the memory system, or in some examples, a controller of a computing system in which the memory system is used. In various embodiments, the present system includes multiple DRAM devices with one or more command and address buses. A clock is used for one or more DRAM devices at each location with one command and address bus or a set of temporally aligned command and address buses. Each distributed clock signal can be trained individually for optimal alignment with the command and address signals for the one or more DRAM devices at that location. While DIMM with DRAM devices is specifically discussed as an example, the present method and system can be applied in any systems in which alignment of clock signals individually at various locations is desirable.

Figure 2:
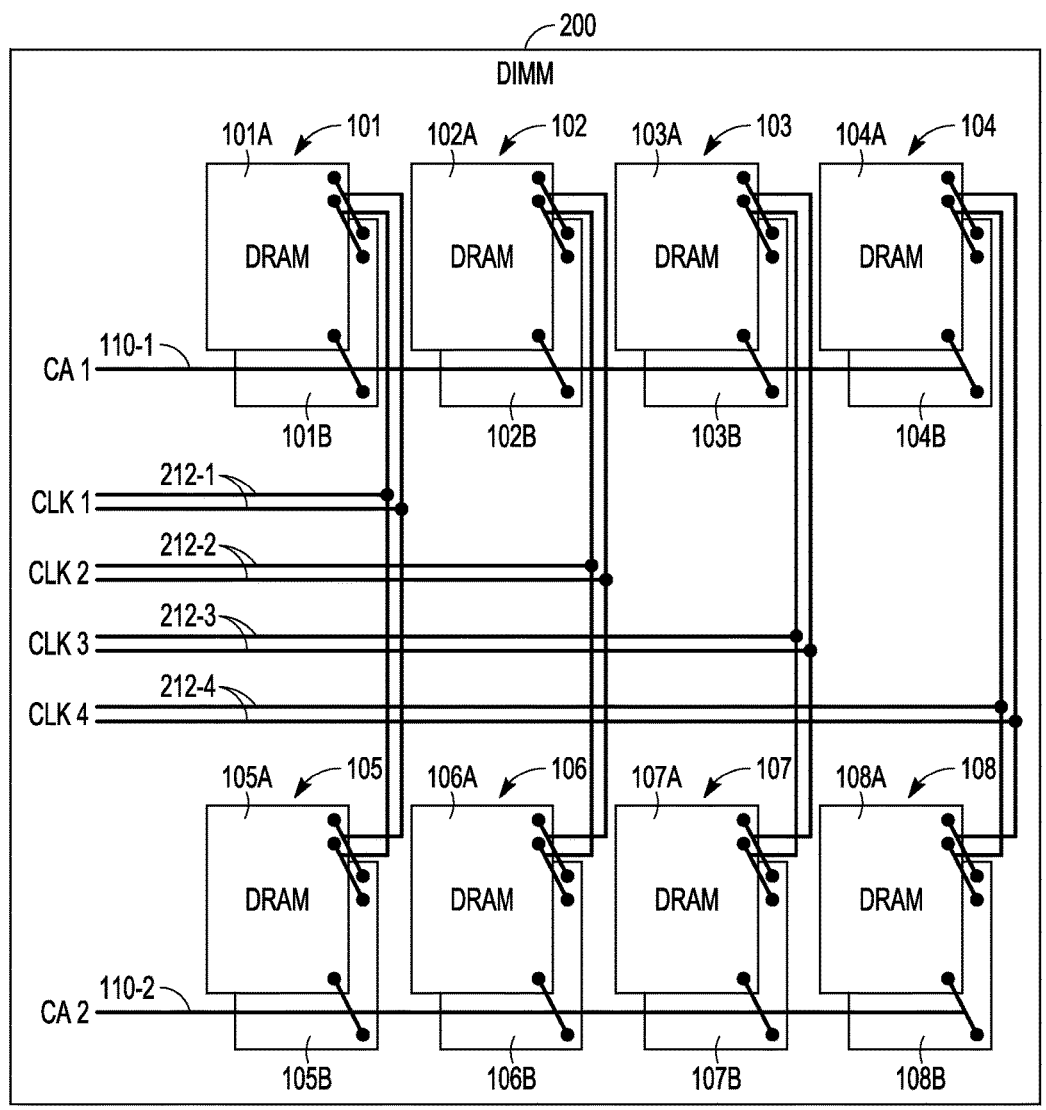
FIG. 2 illustrates an example of portions of a circuit of a DIMM with command and address lines, with clock lines in a tree structure.

FIG. 2 illustrates an example of portions of a circuit of DIMM 200 with command and address buses 110-1 and 110-2 and clock lines 212-1, 212-2, 212-3, and 212-4 in a tree structure. DIMM 200 is identical or substantially similar to DIMM except for the clock lines, which are in the tree structure allowing for complete training of the clock signals CLK 1, CLK 2, CLK 3, and CLK 4 for all DRAM devices 101, 102, 103, 104, 105, 106, 107, and 108. While eight DRAM devices in two rows are shown as an example for the purpose of illustration, the present subject matter can be applied in memory systems including any number of DRAMs or other integrated circuit memory devices connected to one or more command and address buses and connected to multiple clock lines.

In various examples, DIMM 200 includes memory devices each being an integrated circuit memory device (e.g., DRAM devices 101, 102, 103, 104, 105, 106, 107, and 108), one or more command and address buses (e.g., command and address buses 110-1 and 110-2), and clock lines (e.g., clock lines 212-1, 212-2, 212-3, and 212-4). The one or more command and address buses are each connected to at least one, and in the depicted example, more than one, of the multiple memory devices to transmit command and address signals to each memory device of the multiple memory devices. The clock lines are connected to the multiple memory devices in a tree structure to transmit multiple distributed clock signals to each memory device of the multiple memory devices. The tree structure allows each distributed clock signal to be individually trained such that the multiple distributed clock signals provide each connected memory device of the multiple memory devices with a respective distributed clock signal that is temporally aligned with the command and address signals as received by that memory device.

In the illustrated example, DRAM devices 101 and 105 are directly connected to differential clock line 212-1 to receive differential clock signal CLK 1. DRAM devices 102 and 106 are directly connected to differential clock line 212-2 to receive differential clock signal CLK 2. DRAM devices 103 and 107 are directly connected to differential clock line 212-3 to receive differential clock signal CLK 3. DRAM devices 104 and 108 are directly connected to differential clock line 212-4 to receive differential clock signal CLK 4. Being "directly connected" means being connected without going through another memory device.

Figure 3:
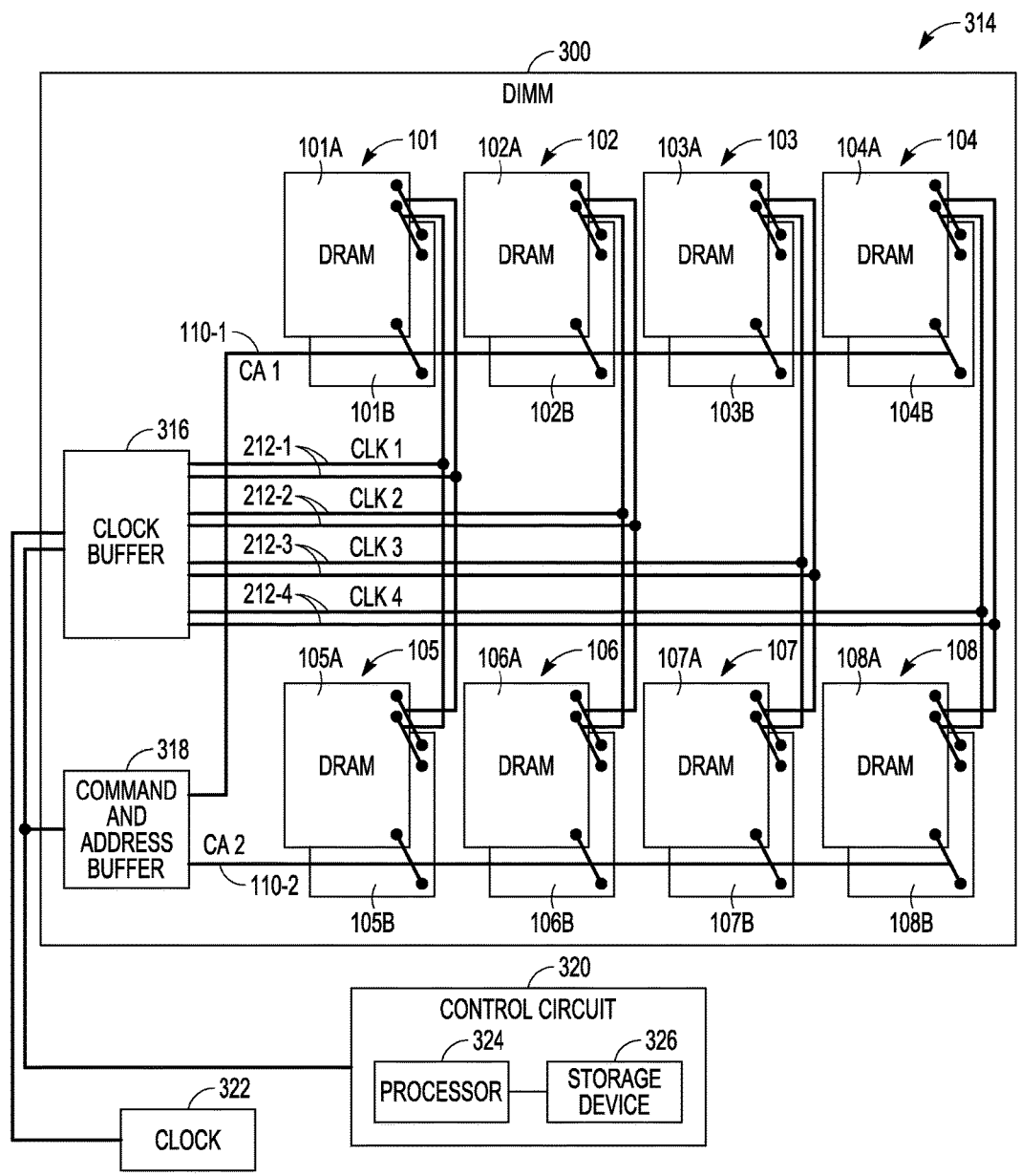
FIG. 3 illustrates an example of portions of a circuit of a computing system including a DIMM.

FIG. 3 illustrates an example of portion of a circuit of a computing system 314 including a DIMM 300. DIMM 300 represents an example of DIMM 200 showing additional circuitry. System 314 can include any computing system in which a DIMM in used, such as a desktop, laptop, or tablet computer, a workstation, a server, a printer, a cellphone, or any other device having a processor that reads from writes into a data storage device.

System 314 includes DIMM 300 connected to a control circuit 320 and a clock 322. DIMM 300 includes the circuit of DIMM 200 as illustrated in FIG. 2, a clock buffer 316, and a command and address buffer 318. Command and address buffer 318 can receive command and address signals from control circuit 320 and transmit the received command and address signals (CA1 and CA2) to DRAM devices 101, 102, 103, 104, 105, 106, 107, and 108 via command and address buses 110-1 and 110-2.

Clock buffer 316 can receive one or more source clock signals from clock 322, produce multiple distributed clock signals (CLK 1, CLK 2, CLK 3, and CLK 4) based on the received clock signal(s), and transmit each of the multiple distributed clock signals to one or more respective connected DRAM devices 101, 102, 103, 104, 105, 106, 107, and 108 via clock lines 212-1. 212-2. 212-3, and 212-4. Clock buffer 316 receives clock training signals from control circuit 320 and allows clock training for each distributed clock signal of the multiple distributed clock signals using the clock training signals. The distributed clock signals can be trained such that the multiple distributed clock signals provides each of DRAM devices 101, 102, 103, 104, 105, 106, 107, and 108 with a distributed clock signal that is temporally aligned with the command and address signals as received by that DRAM device. This temporal alignment ensures that the command and address signals are clocked into the DRAM device during their intended states. In other words, there is a time window during which the command and address signals should be clocked into the DRAM device, and the distributed clock signal is temporally aligned to clock the command and address signals within this time window. The clock training (as discussed below) ensures proper clocking of the command and address signals into each of DRAM devices 101, 102, 103, 104, 105, 106, 107, and 108. When a clock line is connected directly between clock buffer 316 and two or more DRAM devices (e.g., each of the pairs of DRAM devices 101 and 105, 102 and 106, 103 and 107, or 104 and 108), the clock training for each DRAM device can be performed by training a distributed signal for all of the two or more DRAM devices. In the illustrated example, this means only four clock signals, CLK 1, CLK 2, CLK 3, and CLK 4, are needed for the right DRAM devices because each of these clock signals can be trained for a pair of the DRAM devices, 101 and 105, 102 and 106, 103 and 107, or 104 and 108, respectively. In other works, when CLK 1 is trained for DRAM devices 101 and 105, for example, it is trained for each of DRAM devices 101 and 105.

Control circuit 320 can include a processor 324 and a storage device 326. Processor 324 can control the transmission of the command and address signals to DRAM devices 101, 102, 103, 104, 105, 106, 107, and 108 from command and address buffer 318, and can control the transmission of the clock signals to DRAM devices 101, 102, 103, 104, 105, 106, 107, and 108 from clock buffer 316. Storage device 326 can include any storage medium storing instructions for execution by processor 324 to perform various functions of system 314, including the functions discussed in this document.

Processor 324 can control the clock training through clock buffer 316 by producing the clock training signals and transmitting the clock training signals to clock buffer 316. Processor 324 can train each of distributed clock signals CLK 1, CLK 2, CLK 3, and CLK 4 individually, using states and values stored in a memory device such as storage device 326, one of the DRAM devices in DIMM 300, or registers in DIMM 300. In an example, an alignment signal can be stored in the memory device to indicate whether the clock signal properly clocks the command and address signals into the targeted DRAM device(s). The alignment signal is in one of its binary states when the clock signal properly clocks the command and address signals into the targeted DRAM device(s), and in the other of its binary state the clock signal fails to properly clock the command and address lines into the targeted DRAM device(s). Processor 324 can (1) skew a clock signal (e.g., CLK1) toward a first temporal direction until that clock signal reaches a first alignment threshold when the alignment signal changes its state to indicate that the clock signal fails to properly clock the command and address lines into the targeted DRAM device(s) (e.g., DRAM devices 101 and 105), (2) record the first alignment threshold (a point of time) in the memory device, (3) skew the same clock signal (e.g., CLK1) toward a second temporal direction opposite to the first temporal direction until that clock signal reaches a second alignment threshold when the alignment signal changes its state to indicate that the clock signal fails to properly clock the command and address lines into the targeted DRAM device(s) (e.g., DRAM devices 101 and 105), (4) record the second alignment threshold (another point of time) in the memory device, (5) set a phase of the clock signal (e.g., CLK 1) using the first and second temporal thresholds (e.g., a midpoint of time between the first and second temporal thresholds), and (6) record the phase in the memory device for timing the clock signal (e.g., CLK 1). The clock signals are fully trained when all the clock signals (CLK1, CLK2, CLK3, and CLK4) have been individually trained. Clock 322 can produce the one or more source clock signals.

Figure 4:
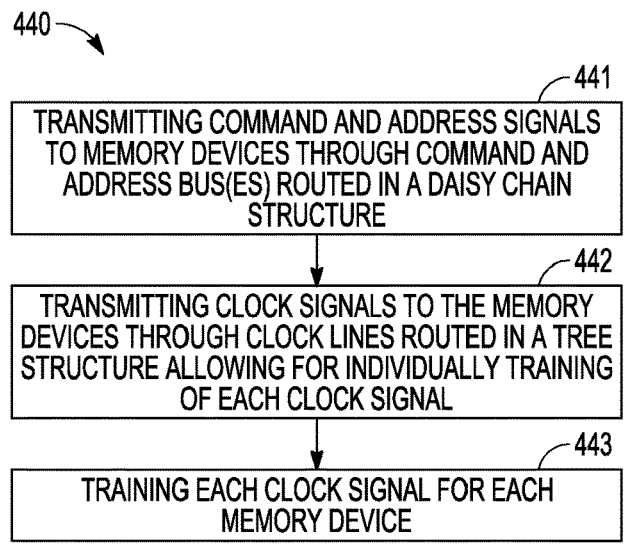
FIG. 4 illustrates an example of a method for distributing clock signals in a system of devices.

FIG. 4 illustrates an example of a method 440 for distributing clock signals in a system of devices. In one example, method 400 is performed for transmitting clock signals to memory devices, such as DRAM devices in a DIMM. The clock signals are used to clock command and address signals into the DRAM devices.

At 441, command and address signals are transmitted to multiple memory devices (e.g., DRAM devices of a DIMM) through one or more command and address buses. At 442, multiple distributed clock signals is transmitted to the multiple memory devices through multiple clock lines routed in a tree structure. The tree structure allows each distributed clock signal of multiple distributed clock signals to be individually trained. A clock buffer (e.g., a clock buffer of the DIMM) can be used to receive one or more source clock signals, produce the multiple distributed clock signals based on the received one or more clock signals, adjust the multiple distributed clock signals, and transmit the multiple distributed clock signals to the multiple memory devices. The multiple the distributed clock signals is adjusted to provide each memory device with a distributed clock signal that is temporally aligned with the command and address signals as received by that memory device. In one example, a distributed clock signal of the multiple distributed clock signals can be transmitted to two or more memory devices of the multiple memory devices, when the distributed clock signal can be trained for the two or more memory devices based on the timing of arrival of the command and address signals at the two or more memory devices. At 443, each distributed clock signal of the multiple distributed clock signals is trained individually for each memory device of the multiple memory devices based on timing of arrival of the command and address signals at the each memory device. In one example, clock training signals are received from a processor of a system in which the multiple memory devices is used, and the adjustment of the multiple the distributed clock signals is controlled using the clock training signals.

Figure 5:
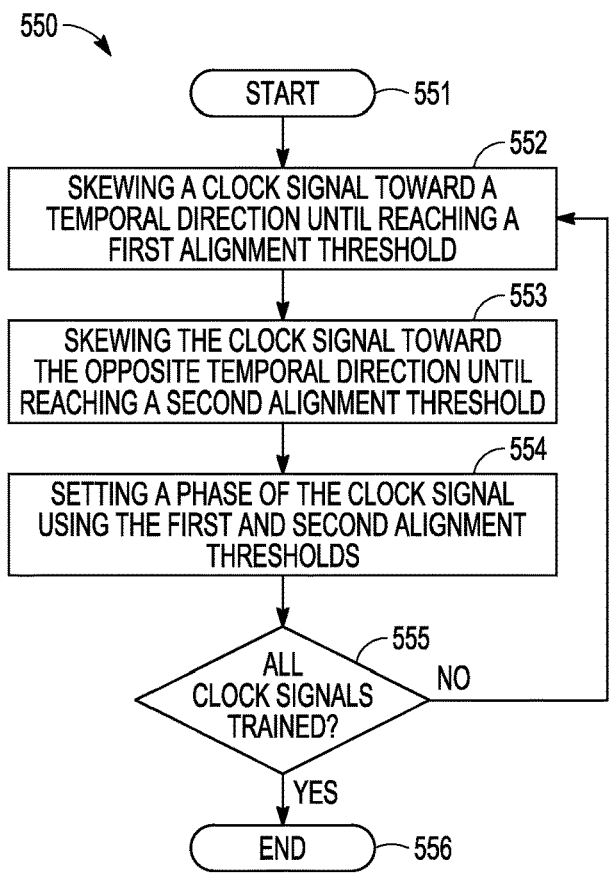
FIG. 5 illustrates an example of a method for clock training performed in the method of FIG. 4.

FIG. 5 illustrates an example of a method 550 for clock training performed in method 440 (i.e., step 443). In one example, performance of method 550 can be controlled by processor 324, and storage device 326 stores computer-readable instructions for execution by processor 324 to perform method 550.

At 551, the clock training is started. At 552, each distributed clock signal of the multiple distributed clock signals is skewed toward a first temporal direction until reaching a first alignment threshold. At 553, the same distributed clock signal is skewed toward a second temporal direction until reaching a second alignment threshold. The first and second temporal direction are opposite temporal directions. The first and second alignment thresholds are each a threshold beyond which the distributed clock signal fails to clock the command and address signals into a memory device receiving the command and address signals and the distributed clock signal. At 554, a phase of the distributed clock signal is set using the first and second alignment thresholds (e.g., set to a midpoint between the first and second alignment thresholds). At 555, if all the distributed clock signals have been individually trained, the clock training ends at 556. If at least one of the distributed clock signals has not been trained, steps 552, 553, and 554 are repeated for an untrained distributed clock signal.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A computing system, comprising:
   multiple memory devices each being an integrated circuit memory device;
   one or more command and address buses, each connected to one or more of the multiple memory devices to transmit command and address signals to each of the multiple memory devices; and
   multiple clock lines connected to the multiple memory devices in a tree structure to transmit multiple distributed clock signals to each memory device of the multiple memory devices, the tree structure allowing each distributed clock signal of the multiple distributed clock signals to be individually trained such that the multiple distributed clock signals provide each memory device with a respective distributed clock signal that is temporally aligned with the command and address signals as received by that memory device, the multiple clock lines including a clock line directly connected to two or more memory devices of the multiple memory devices to allow a distributed clock signal of the multiple distributed signals to be individually trained for the two or more directly connected memory devices receiving that distributed clock signal.

2. The system of claim 1, wherein each memory device of multiple memory devices comprises a dynamic random access memory (DRAM) device.

3. The system of claim 2, comprising a dual in-line memory module (DIMM) including the multiple memory devices, the one or more command and address buses, and the multiple clock lines.

4. The system of claim 3, wherein the DIMM further comprises a clock buffer configured to receive one or more source clock signals, to produce the multiple distributed clock signals based on the received one or more source clock signals, and to transmit the multiple distributed clock signals to the multiple memory devices.

5. The system of claim 4, wherein the clock buffer is configured to receive clock training signals and allow each distributed clock signal of the multiple distributed clock signals to be trained according to the received clock training signals.

6. The system of claim 5, further comprising a processor coupled to the DIMM and configured to train each distributed clock signal of the multiple distributed clock signals for one or more targeted memory devices connected to receive a respective distributed clock signal by producing the clock training signals and transmitting the clock training signals to the clock buffer.

7. The system of claim 6, wherein the processor is configured to skew the each distributed clock signal toward a first temporal direction until reaching a first alignment threshold, to skew the each distributed clock signal toward a second temporal direction until reaching a second alignment threshold, and to set a phase of the each distributed clock signal using the first and second alignment thresholds, the first and second temporal direction being opposite temporal directions, the first and second alignment thresholds each being a threshold beyond which the each distributed clock signal fails to clock the command and address signals into the one or more targeted memory devices.

8. The system of claim 1, wherein the multiple clock lines are each directly connected to two or more memory devices of the multiple memory devices.

9. A circuit for a dual in-line memory module (DIMM), comprising:
   multiple dynamic random access memory (DRAM) devices;
   a command and address buffer configured to generate command and address signals for the multiple memory devices;
   one or more command and address buses connected between the command and address buffer and respective DRAM devices to transmit the command and address signals to the multiple memory devices;
   a clock buffer configured to transmit multiple distributed clock signals to the multiple DRAM devices; and
   multiple clock lines connected between the clock buffer and the DRAM devices in a manner allowing each distributed clock signal to be individually trained for each DRAM device receiving the respective clock signal based on timing of arrival of the command and address signals at the each DRAM device, the multiple clock lines including a clock line directly connected between the clock buffer and two or more DRAM devices of the multiple DRAM devices to allow a distributed clock signal to be individually trained for the two or more connected DRAM devices receiving that distributed clock signal.

10. The circuit of claim 9, wherein the multiple DRAM devices comprise at least eight DRAM devices, and the two or more DRAM devices comprise two DRAM devices.

11. The circuit of claim 9, wherein the clock buffer is configured to receive at least one source clock signal and to produce the multiple distributed clock signals based on the received at least one source clock signal.

12. The circuit of claim 11, wherein the clock buffer is configured to allow individual adjustment of each distributed clock signal of the multiple distributed clock signals, the adjustment including shifting a phase of the each distributed clock signal.

13. The system of claim 9, further comprising a processor coupled to e clock buffer and configured to train each distributed clock signal of the multiple distributed clock signals for one or more targeted memory devices connected to receive a respective distributed clock signal by producing the clock training signals and transmitting the clock training signals to the clock buffer.

14. The system of claim 13, wherein the processor is configured to skew the each distributed clock signal toward a first temporal direction until reaching a first alignment threshold, to skew the each distributed clock signal toward a second temporal direction until reaching a second alignment threshold, and to set a phase of the each distributed clock signal using the first and second alignment thresholds, the first and second temporal direction being opposite temporal directions, the first and second alignment thresholds each being a threshold beyond which the each distributed clock signal fails to clock the command and address signals into the one or more targeted memory devices.

15. A method for operating a system including multiple memory devices, the method comprising:
transmitting command and address signals to the multiple memory devices through one or more command and address buses;
transmitting multiple distributed clock signals to the multiple memory devices through multiple clock lines routed in a tree structure that allows each distributed clock signal of the multiple distributed clock signals to be individually trained including transmitting a distributed clock signal of the multiple distributed clock signals directly to two or more memory devices of the multiple memory devices; and
training each distributed clock signal the multiple distributed clock signals individually for each memory device receiving the respective clock signal based on timing of arrival of the command and address signals at that memory device.

16. The method of claim 15, wherein transmitting the command and address signals to the multiple memory devices comprises transmitting the command and address signals to multiple dynamic random access memory (DRAM) devices of a dual in-line memory module (DIMM), and transmitting the multiple distributed clock signals to the multiple memory devices comprises transmitting the multiple distributed clock signals to the multiple DRAM devices of the DIMM.

17. The method of claim 16, further comprising:
receiving one or more source clock signals using a clock buffer of the DIMM;
producing the multiple distributed clock signals based on the received one or more source clock signals using the clock buffer;
adjusting the multiple the distributed clock signals using the clock buffer, such that the multiple distributed clock signals provide each DRAM device of the DIMM with a distributed clock signal that is temporally aligned with the command and address signals as received by that DRAM device; and
transmitting the multiple distributed clock signals to the multiple DRAM devices from the clock buffer.

18. The method of claim 17, wherein transmitting the distributed clock signal of the multiple distributed clock signals to the two or more memory devices of the multiple memory devices comprises transmitting the distributed clock signal of the multiple distributed clock signals to two memory devices of the multiple memory devices.

19. The method of claim 17, wherein adjusting the multiple the distributed clock signals using the clock buffer comprises:
receiving clock training signals from a processor of the system using the clock buffer; and
controlling the adjustment of the multiple the distributed clock signals using the clock training signals.

20. The method of claim 19, further comprising the clock raining signals for:
skewing each distributed clock signal of the multiple distributed clock signals toward a first temporal direction until reaching a first alignment threshold;
skewing the each distributed clock signal toward a second temporal direction until reaching a second alignment threshold; and
setting a phase of the each distributed clock signal using the first and second align thresholds,
wherein the first second temporal direction are opposite temporal directions, the first and second alignment thresholds are each a threshold beyond which the each distributed clock signal fails to clock the command and address signals into a memory device receiving the command and address signals and the each distributed clock signal.

* * * * *